No. 739,683. PATENTED SEPT. 22, 1903.
J. N. KEACH.
THILL COUPLING.
APPLICATION FILED JULY 9, 1903.
NO MODEL. 2 SHEETS—SHEET 1.
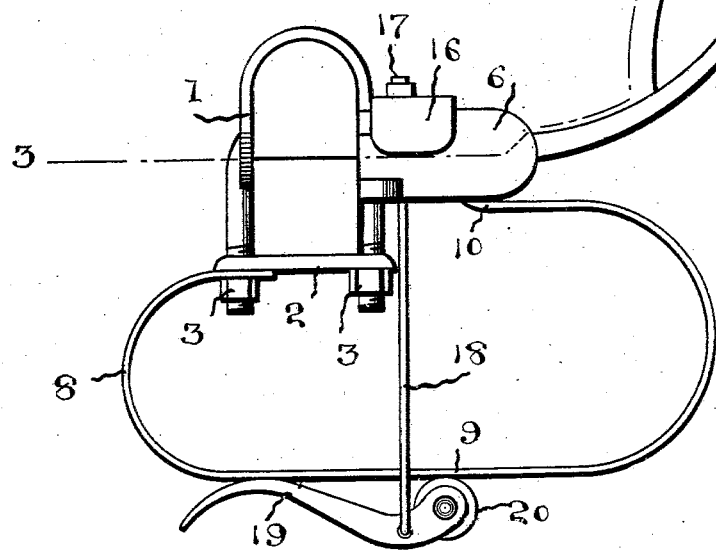
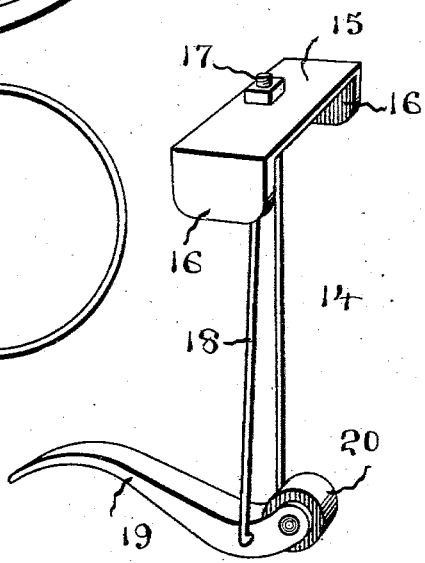
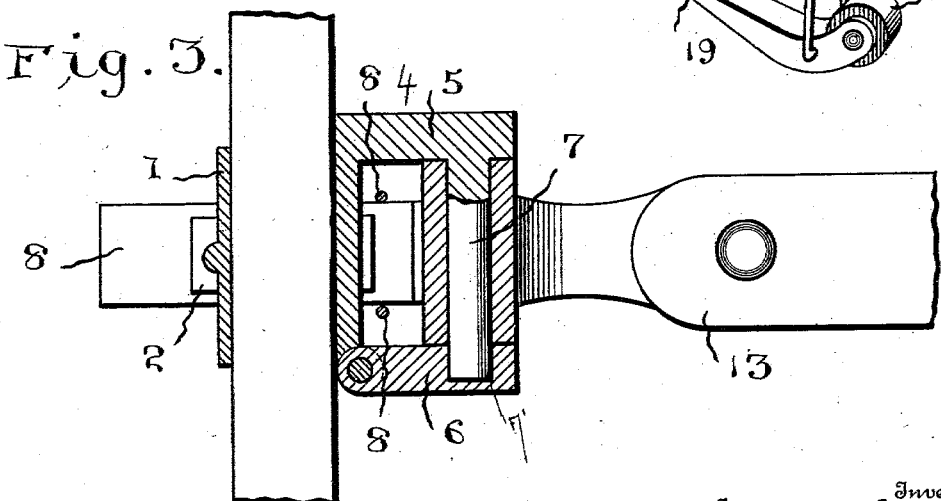
Witnesses
F. W. Riley
Chas. S. Hyer.
Inventor
Jas. Nelson Keach.
By Victor J. Evans
Attorney

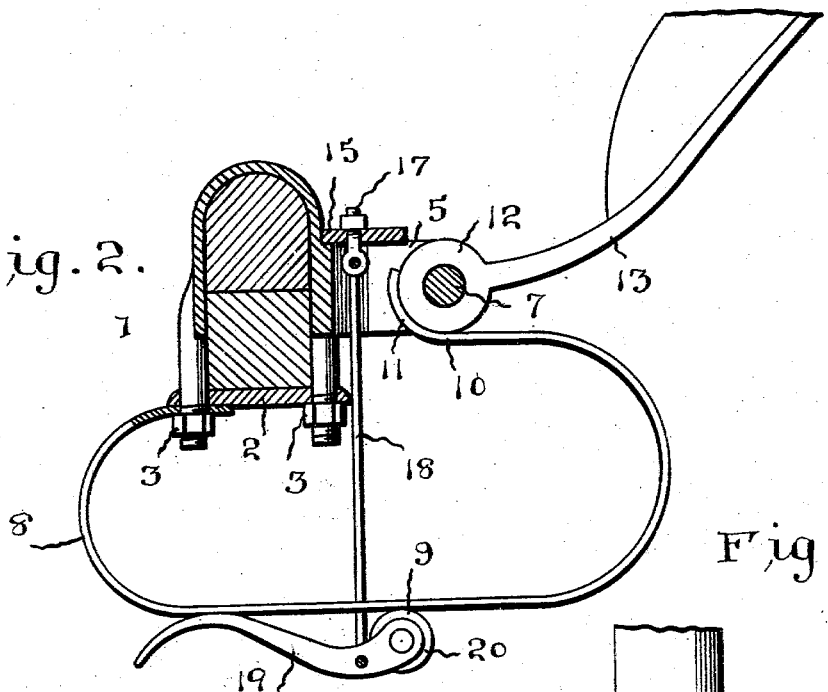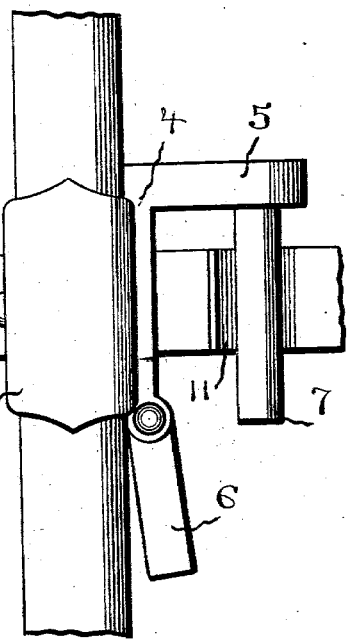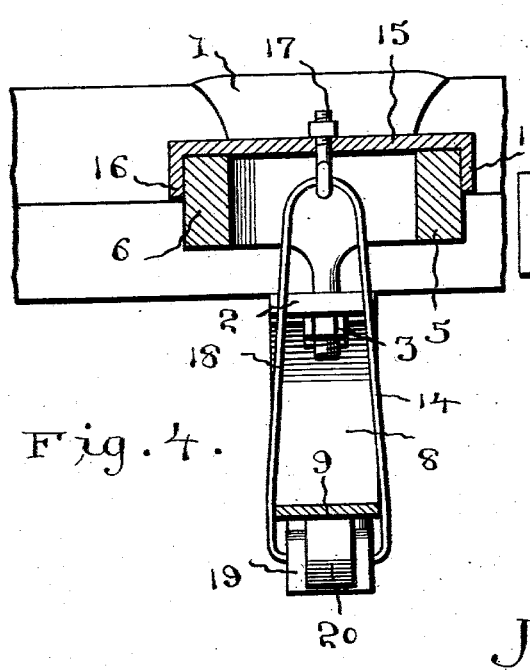

No. 739,683.

Patented September 22, 1903.

UNITED STATES PATENT OFFICE.

JAMES NELSON KEACH, OF BLOOMINGTON, ILLINOIS.

THILL-COUPLING.

SPECIFICATION forming part of Letters Patent No. 739,683, dated September 22, 1903.

Application filed July 9, 1903. Serial No. 164,858. (No model.)

*To all whom it may concern:*

Be it known that I, JAMES NELSON KEACH, a citizen of the United States, residing at Bloomington, in the county of McLean and State of Illinois, have invented new and useful Improvements in Thill-Couplings, of which the following is a specification.

This invention relates to thill couplings or shackles for buggies and other vehicles; and the object of the same is to provide simple and effective means for permitting the eyes of the thill-irons to be readily applied to the clips or detached from the latter and to have the thill-irons when attached to the clips prevented from movement or undue wear on the coupling pins or projections.

In thill couplings or shackles as heretofore constructed in many instances the operation of attaching and disconnecting the thill-irons from the clips required such a complex manipulation that the use of the same were undesirable, and the present invention is intended to overcome inconveniences encountered in the couplings now generally used.

The invention consists in the construction and arrangement of the several parts, which will be more fully hereinafter discribed and claimed.

In the drawings, Figure 1 is a side elevation of a coupling or shackle embodying the features of the invention and showing a portion of a thill-iron and thill attached thereto. Fig. 2 is a longitudinal vertical section taken through the center of the parts as shown by Fig. 1. Fig. 3 is a horizontal section on the line 3 3, Fig. 1. Fig. 4 is a transverse vertical section taken through the coupling in advance of the clip. Fig. 5 is a top plan view of the coupling shown open and the securing element detached. Fig. 6 is a detail perspective view of the securing element or keeper.

Similar numerals of reference are employed to indicate corresponding parts in the several views.

The improved coupling or shackle includes in its organization the usual form of clip 1, held on the running-gear by an under securing-plate 2, through which the legs of the clip are passed and engaged by nuts 3, the said nuts bearing against the plate 2. Projecting forwardly from the clip 1 and forming a part thereof is a coupling-head 4, having a forwardly-projecting arm 5 at one end and a pivoted latch 6 at the opposite end, with a recess 7' opening out through its inner side adjacent to the free end thereof. Projecting transversely across the head from the arm 5 is a coupling pin or projection 7, which is an integral part of the said arm and of such length as to project into the recess or socket 7', opening out through the inner side of the latch 6.

The rear end of an approximately oval flat spring 8 is secured to the rear leg of the clip 1, the lower horizontal portion 9 of said spring being projected a considerable distance in advance of the clip and continued into an upper semicircular curve having a greater arc than the rear curved extremity of said spring and terminating in an arm 10, having a curved end 11 to bear against the eye 12 of the thill-iron 13. The curved end 11 projects upwardly between the arm 5 and the latch 6 in rear of the pin or projection 7, and when the eye 12 of the thill-iron is coupled the curved end 11 bears with considerable pressure against the rear portion of said eye and serves as an antirattling means with obvious advantages. The coupling also includes a locking element or keeper 14. (Clearly shown in detail by Fig. 6.) This element or keeper consists of an upper locking-plate 15, long enough to extend across the upper edge of the arm 5 and the similar edge of the latch 6 when the latter is closed, and said plate has depending end flanges 16 to take over the outer sides of the arm 5 and latch. Depending from the center of the plate 15 is an eyebolt 17, with the eye thereof directed downwardly and engaged by the upper looped end of an elongated link 18, having its lower terminals secured in the opposite sides of the forward extremity of a cam-lever 19. The forward extremity of the cam-lever 19 is bifurcated, and therein an antifrictional roller 20 is mounted. The link 18 gradually increases in width toward its lower extremity until the opposite members thereof are far enough apart to embrace the lower horizontal portion 9 of the spring 8, and in applying the locking element or keeper in operative position the link 18 is passed downwardly between the arm 5 of the coupling-head 4 and the latch 6 and attached to the cam-lever 19, so that the locking-plate 15 will always be in position to perform its function.

The cam-lever 19 operates against the under side of the horizontal portion 9 of the spring 8, and by attaching the terminals of the link 18 to the said lever at a predetermined point in rear of the forward extremity thereof an eccentric operation ensues, which will cause the said lever to be located when closed against the horizontal portion 9 of the spring, and thus prevent the locking-plate 15 from slipping out of place. In the operation of coupling a thill-iron and thill to the improved device the cam-lever 19 is forced downwardly to cause the roller 20 to move over the under side of the horizontal portion 9 of the spring 8 and slip through the lower part of the link 18 to permit the said lever to be overturned and loosen the locking-plate 15 sufficiently to permit the end flanges 16 thereof to be elevated and disengaged from the arm 5 and latch 6. The latch is then opened to expose the free end of the pin or projection 7, and the eye 12 of the thill-iron 13 is then slipped laterally over the said pin or projection and in contact with the upper curved end 11 of the spring 8. The latch is then closed, the locking-plate 15 pressed downwardly over the arm 5 and latch, and the cam-lever drawn rearwardly under the horizontal portion of the spring 9 and turned until it assumes the position shown by Figs. 1 and 2, and thereby hold the latch 6 against movement and reliably connect the thill-iron to the improved coupling. In releasing the thill-iron the operation of loosening the locking-plate 15 will be pursued and the latch opened, so that the eye 12 can be slipped off the pin or projection 7. Either operation can be quickly carried on without resorting to a complex adjustment or manipulation of the several parts.

It will be observed that the eye 12 of the thill-iron does not have to be modified in the least relatively to the ordinary form of such devices, and the features of construction embodying the invention reside wholly in the coupling proper carried by the clip. This is materially advantageous from a standpoint of economy and manufacture, and it will be understood to accommodate various applications the proportions and dimensions of the several parts may be varied at will.

Having thus fully described the invention, what is claimed as new is—

1. A thill-coupling, having a coupling-head with a rigid arm projecting forwardly from one end thereof and carrying a transversely-extending coupling projection, a latch pivotally secured to the opposite end of the head and having a recess to receive the free terminal of the said projection, a spring depending from and projecting forwardly in advance of the coupling and having an upwardly-extending end in rear of the coupling projection, and a locking element having a plate to fit over the arm of the head and latch and provided with a depending link embracing the lower portion of the spring and attached to a cam-lever movable against the lower part of said spring to hold the plate in locked position.

2. In a thill-coupling, the combination of a coupling-head having a transverse coupling projection, a latch at one end to receive the free end of the said projection, a spring having a forward end extending upwardly in rear of the coupling projection, and a locking element having a plate to engage the latch and one end of the head and connected to the lower cam-lever which operates against the lower portion of the spring.

3. A thill-coupling, consisting of a clip having a coupling-head with a forwardly-projecting arm carrying a transversely-extending coupling projection, and a latch at the opposite end to engage the said projection, a spring held by the clip and having a lower horizontal portion, and a locking element consisting of a plate disposed on the head to engage the latch and connected to a cam-lever operating against the under side of the horizontal portion of the spring.

4. A thill-coupling, consisting of a clip having a coupling-head with a rigid arm carrying a transversely-extending coupling projection, and a latch to receive the free terminal of said projection, a spring secured to the clip and depending below and extending in advance of the latter, and a locking element having a plate engaging said head and latch thereof and loosely connected to a cam-lever adapted to bear against a portion of the spring.

In testimony whereof I affix my signature in presence of two witnesses.

JAMES NELSON KEACH.

Witnesses:
  W. P. JONES,
  CLARK GIDEON.